Figure 1:
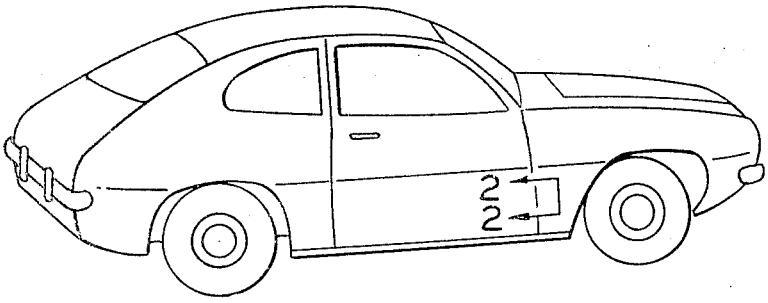
Figure 2:
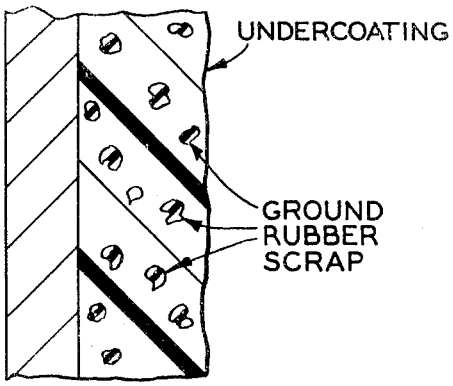
Figure 3:
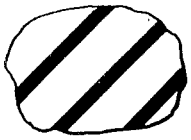
Figure 4:
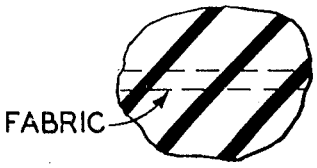

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 4, 1975

931 O.G. 10

T931,006

SOUND-ATTENUATING COATINGS AND COATED PRODUCTS

Joseph R. Laman, Akron, Ohio, assignor to The Firestone Tire & Rubber Company, Akron, Ohio

Continuation of abandoned application Ser. No. 355,363, Apr. 27, 1973. This application May 30, 1974, Ser. No. 474,649

Int. Cl. B32b *15/06, 25/04*

U.S. Cl. 117—132

1 Sheet Drawing. 10 Pages Specification

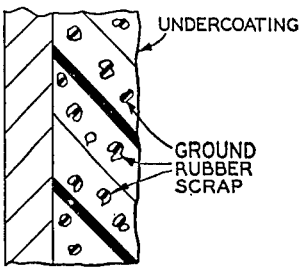

Scrap tires are ground or otherwise reduced to small size particles and 5 to 95 parts by volume were used in 100 parts by volume of noise-attenuating coatings, mixed with the coatings or applied to their surface. The coating vehicles will vary widely in properties, and the invention includes both water-base coatings and organic-base coatings. The invention includes not only the coatings but coated products such as auto fenders, hoods, truck covers, auto floors, under-the-floor mats, the ceilings of rooms, factory ceilings and walls, and many other sheet-metal, etc., products and parts, etc.

SOUND-ATTENUATION COATINGS AND COATED PRODUCTS

Original Filed April 27, 1973